United States Patent
Shoji et al.

(10) Patent No.: US 10,144,287 B2
(45) Date of Patent: Dec. 4, 2018

(54) VEHICLE DISPLAY DEVICE

(71) Applicant: Yazaki Corporation, Tokyo (JP)

(72) Inventors: Kazumasa Shoji, Shizuoka (JP); Ryoko Sone, Shizuoka (JP); Eiji Kibe, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/846,535

(22) Filed: Dec. 19, 2017

(65) Prior Publication Data
US 2018/0215263 A1    Aug. 2, 2018

(30) Foreign Application Priority Data

Jan. 31, 2017 (JP) ................................. 2017-015354

(51) Int. Cl.
*B60K 35/00* (2006.01)
(52) U.S. Cl.
CPC .................................... *B60K 35/00* (2013.01)
(58) Field of Classification Search
CPC . B60K 35/00; G01D 7/04; G01D 7/00; B60R 16/02
See application file for complete search history.

(56) References Cited

U.S. PATENT DOCUMENTS

| 8,773,250 | B2 * | 7/2014 | Sitarski | B60R 1/00 340/438 |
| 8,803,676 | B2 * | 8/2014 | Sitarski | G06T 13/80 340/438 |
| 2007/0085708 | A1 * | 4/2007 | Kato | G01C 21/265 340/995.1 |
| 2013/0127609 | A1 * | 5/2013 | Sitarski | B60R 1/00 340/438 |
| 2013/0127876 | A1 * | 5/2013 | Sitarski | G06T 13/80 345/473 |
| 2017/0253178 | A1 * | 9/2017 | Tane | B60K 35/00 |

FOREIGN PATENT DOCUMENTS

JP    2016-117427 A    6/2016

* cited by examiner

*Primary Examiner* — Nay Tun
(74) *Attorney, Agent, or Firm* — Sughrue Mion, PLLC

(57) ABSTRACT

A vehicle display device includes an image display device disposed in front of a driver aboard a vehicle, and configured to display thereon at least information on traveling conditions of the vehicle, the image display device including an image display region. When an operation input turning on a power supply of the vehicle is provided, the image display device starts an opening presentation thereon in conjunction with the start of an opening presentation on another display device disposed in front of the driver. The image display device displays thereon a predetermined image in a part of the image display region until starting the opening presentation after the operation input is provided.

5 Claims, 17 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2017-015354 filed in Japan on Jan. 31, 2017.

BACKGROUND OF THE INVENTION

1. Field of the Invention

The present invention relates to a vehicle display device.

2. Description of the Related Art

Vehicle display devices for displaying images thereon have been conventionally used. Japanese Patent Application Laid-open No. 2016-117427 discloses a technique in which a vehicle display device including two first and second display units that display thereon vehicle information arranged side by side can operate in a presentation mode in which, while display contents on the first display unit are displayed as changing over time, display contents on the second display unit are displayed as changing in response to the change of display contents on the first display unit.

A vehicle may have not only a vehicle display device but also another display device installed thereon. If these display devices start presentations at times independent from one another, a feeling of congruence therebetween cannot be brought. For example, time periods needed to complete startup of the respective display devices after an operation input turning on a power supply of the vehicle is provided are different among the display devices. It is desired that the vehicle display device be capable of bringing a feeling of congruence thereof with the other display device.

SUMMARY OF THE INVENTION

It is an object of the present invention to provide a vehicle display device capable of bringing a feeling of congruence thereof with another display.

In order to achieve the above mentioned object, a vehicle display device according to one aspect of the present invention includes an image display device disposed in front of a driver in a vehicle, and configured to display thereon at least information relating to traveling conditions of the vehicle, the image display device including an image display region, wherein when an operation input turning on a power supply of the vehicle is provided, the image display device starts an opening presentation thereon in conjunction with start of an opening presentation of another display device disposed in front of the driver, and the image display device displays a predetermined image on a part of the image display region until starting the opening presentation after the operation input is provided.

According to another aspect of the present invention, in the vehicle display device, the predetermined image may be an image of an indicator needle that indicates a revolution speed of an engine installed on the vehicle.

According to still another aspect of the present invention, in the vehicle display device, when the engine is started after the operation input is provided, the image display device may display the image of the indicator needle at a position corresponding to the revolution speed of the engine.

According to still another aspect of the present invention, in the vehicle display device, the image display device may not change a display position of the predetermined image until starting the opening presentation, and, after the opening presentation is started, may change the display position of the predetermined image and perform the opening presentation using the predetermined image as one element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a vehicle display device according to an embodiment of the present invention in detail with reference to the drawings. This embodiment is not intended to limit the invention. Components included in the following embodiment may include a component that the skilled person can easily thought of and may include components substantially the same as each other.

Embodiment

Figure 1:
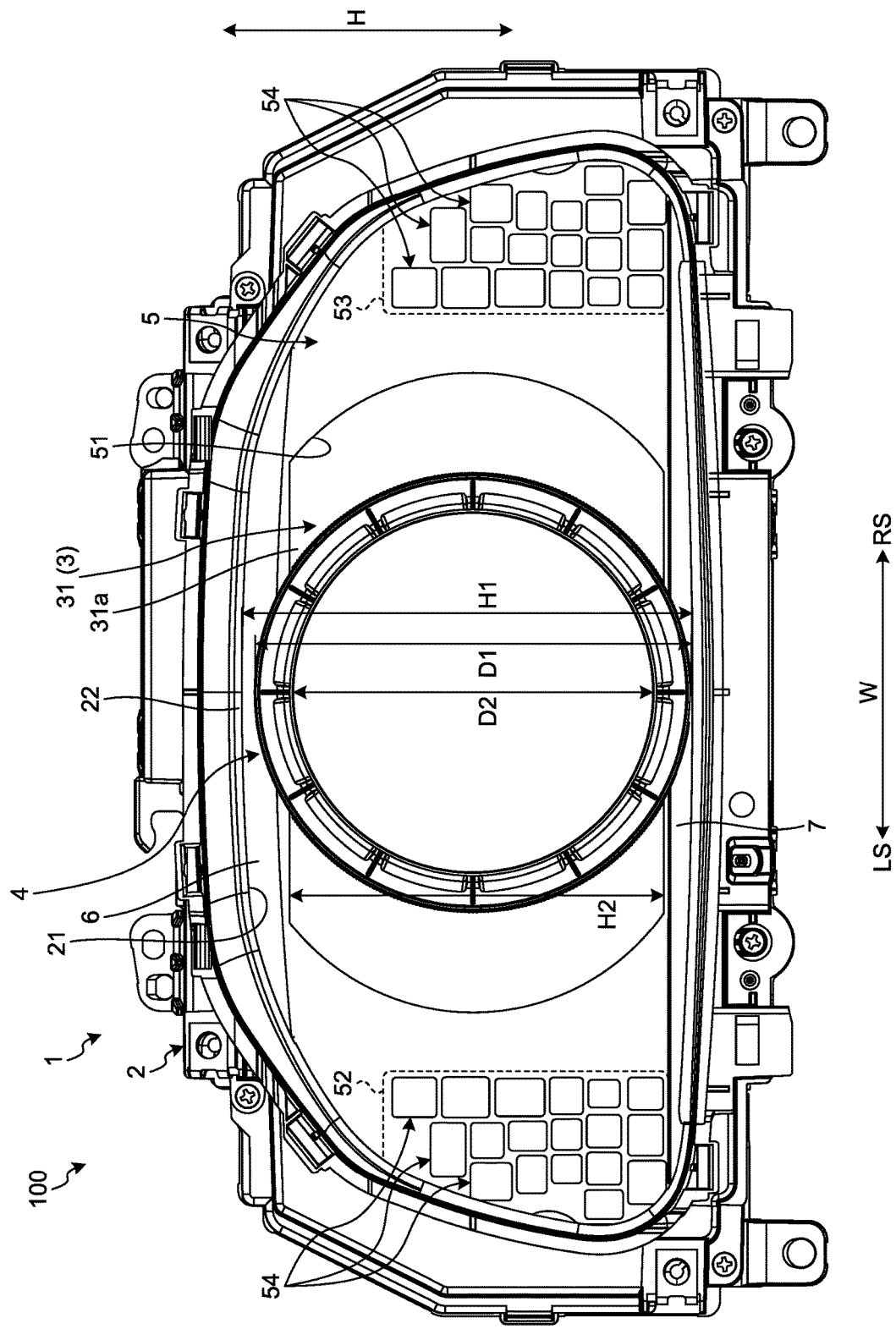
FIG. 1 is a front view of a vehicle display device according to an embodiment.
Figure 2:
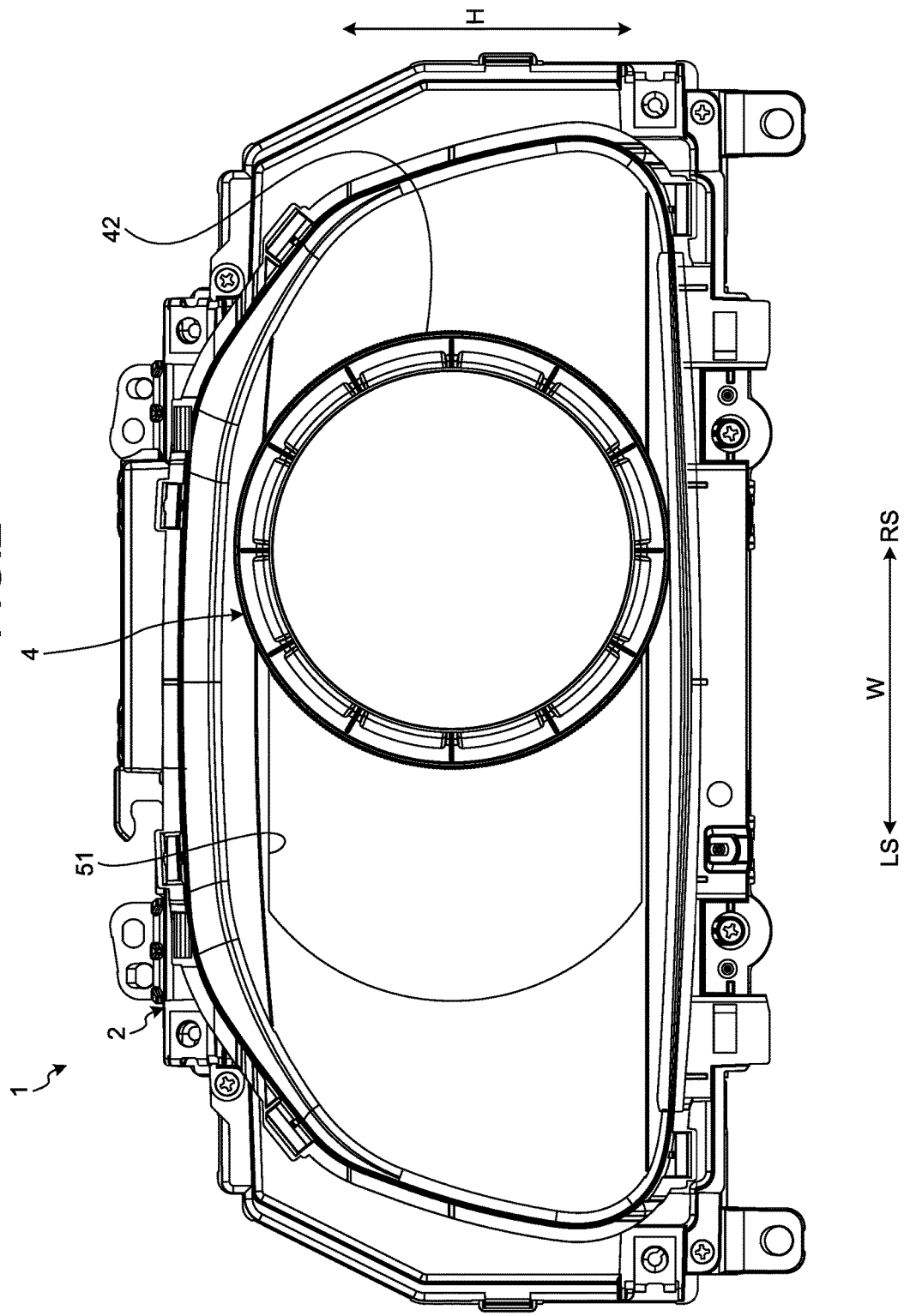
FIG. 2 is a front view of a state in which a ring is at a second position in the vehicle display device according to the embodiment.
Figure 3:
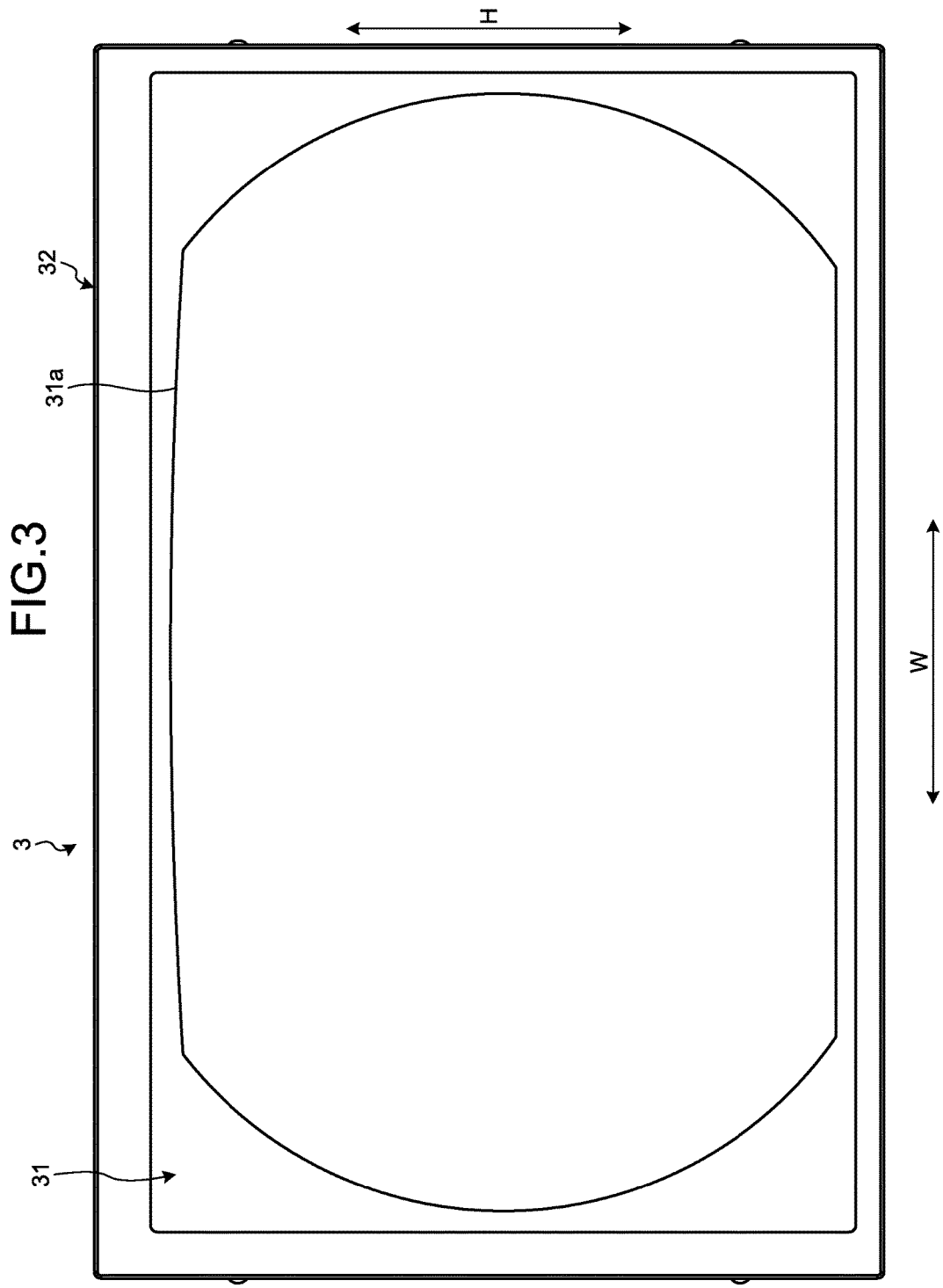
FIG. 3 is a front view of an image display device according to the embodiment.
Figure 4:
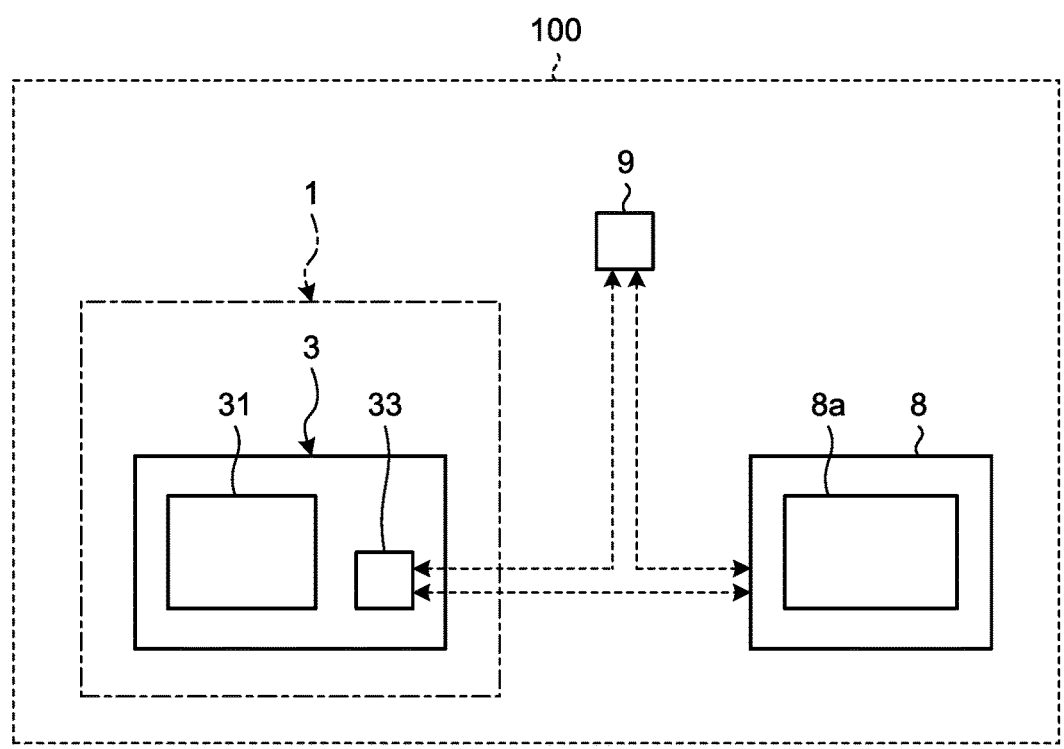
FIG. 4 is a block diagram for the vehicle display device according to the embodiment.
Figure 5:
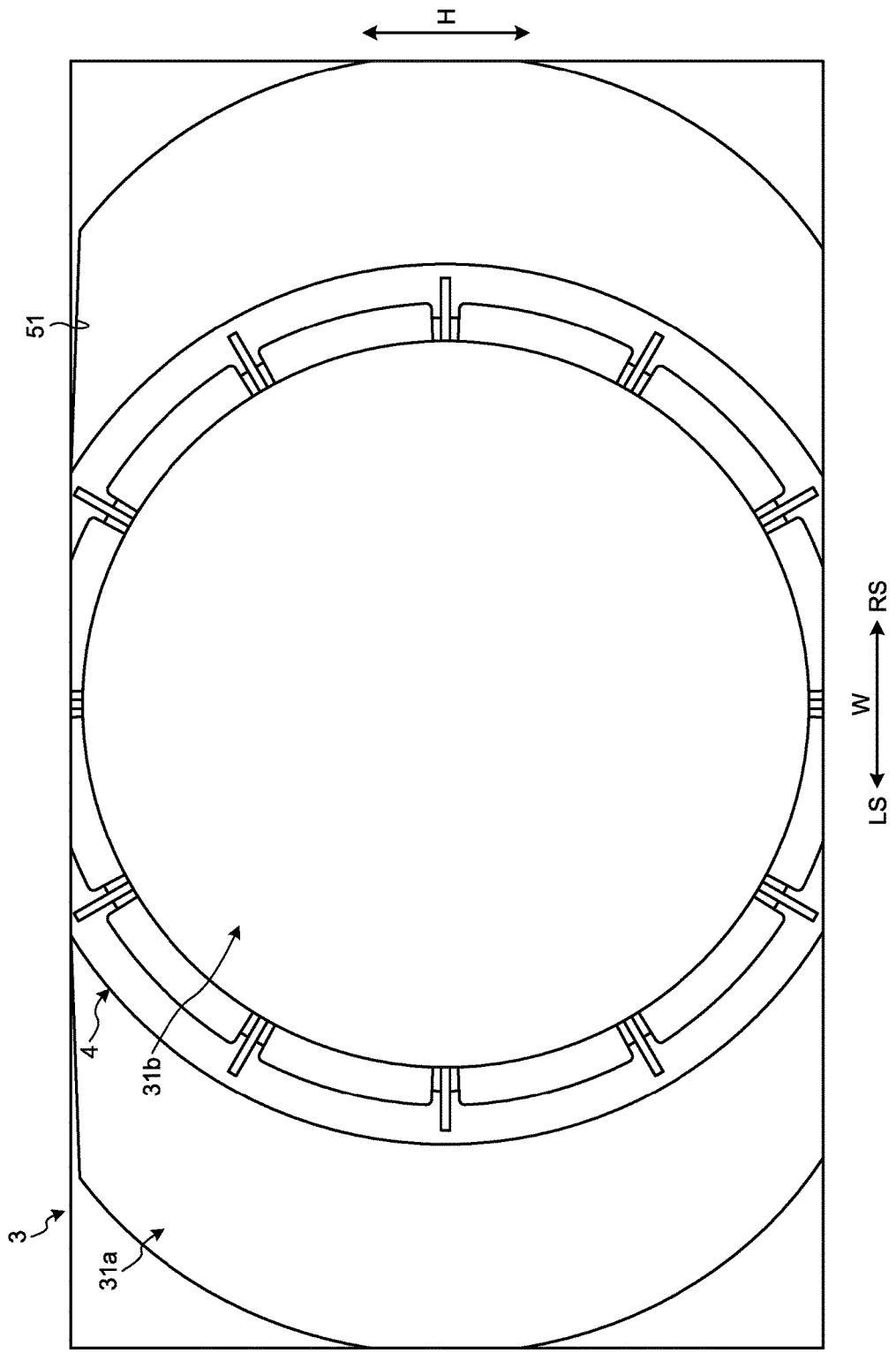
FIG. 5 is a view illustrating a state in which the vehicle display device according to the embodiment has not been powered off.
Figure 6:
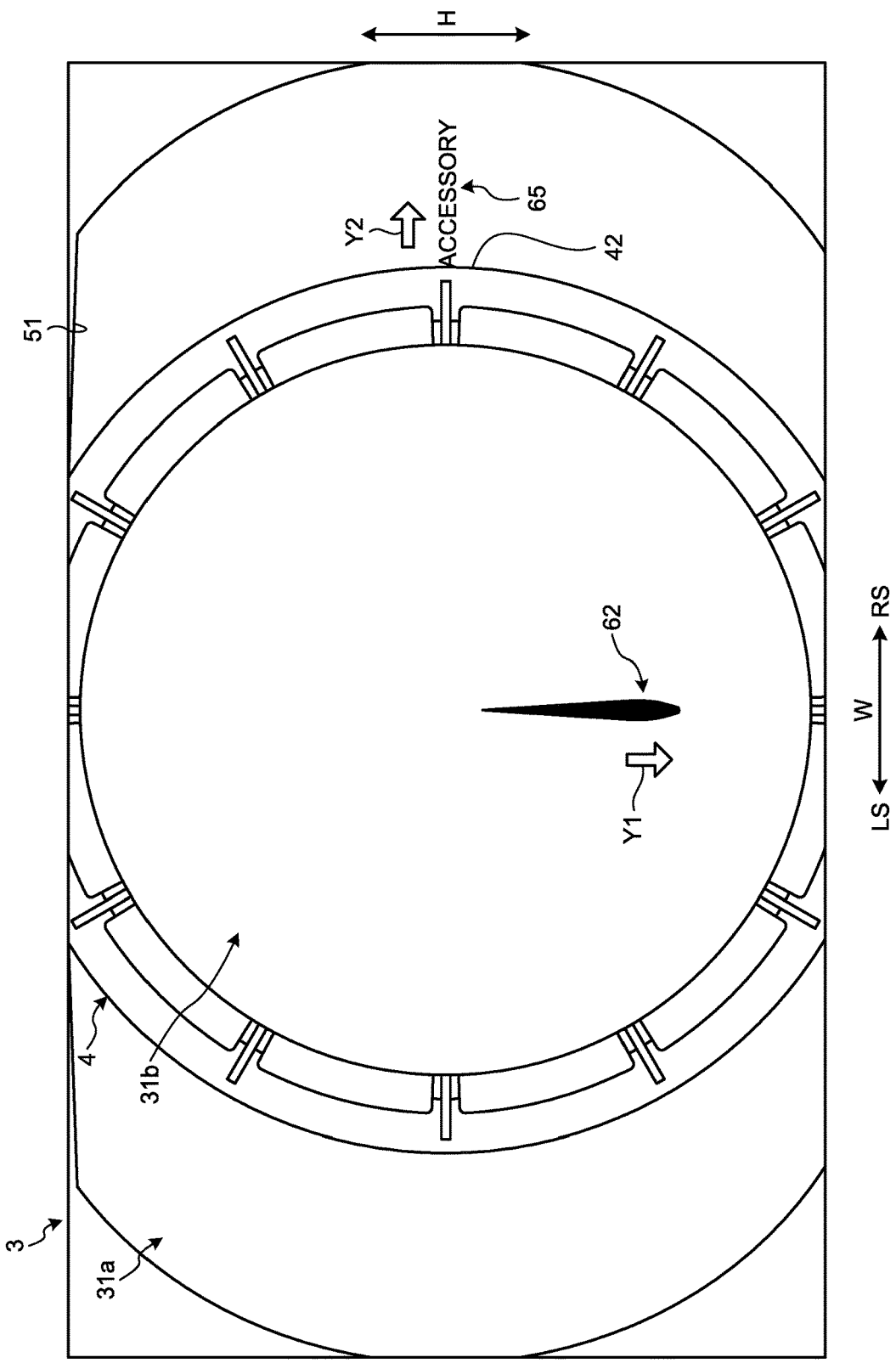
FIG. 6 is a view of the vehicle display device according to the embodiment halfway in the process of displaying a predetermined image thereon.
Figure 7:
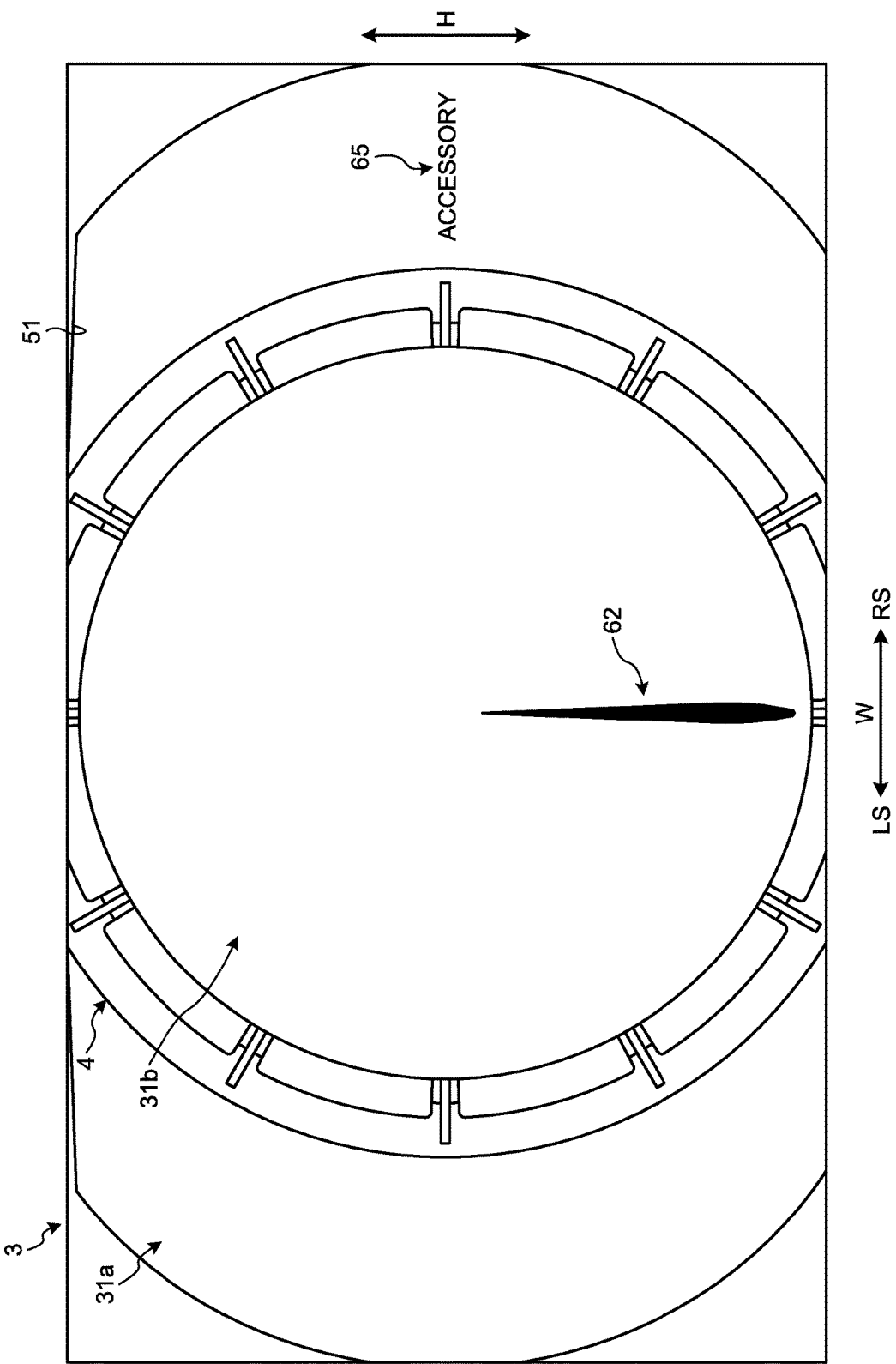
FIG. 7 is a view illustrating a state in which the vehicle display device according to the embodiment has a predetermined image displayed thereon.
Figure 8:
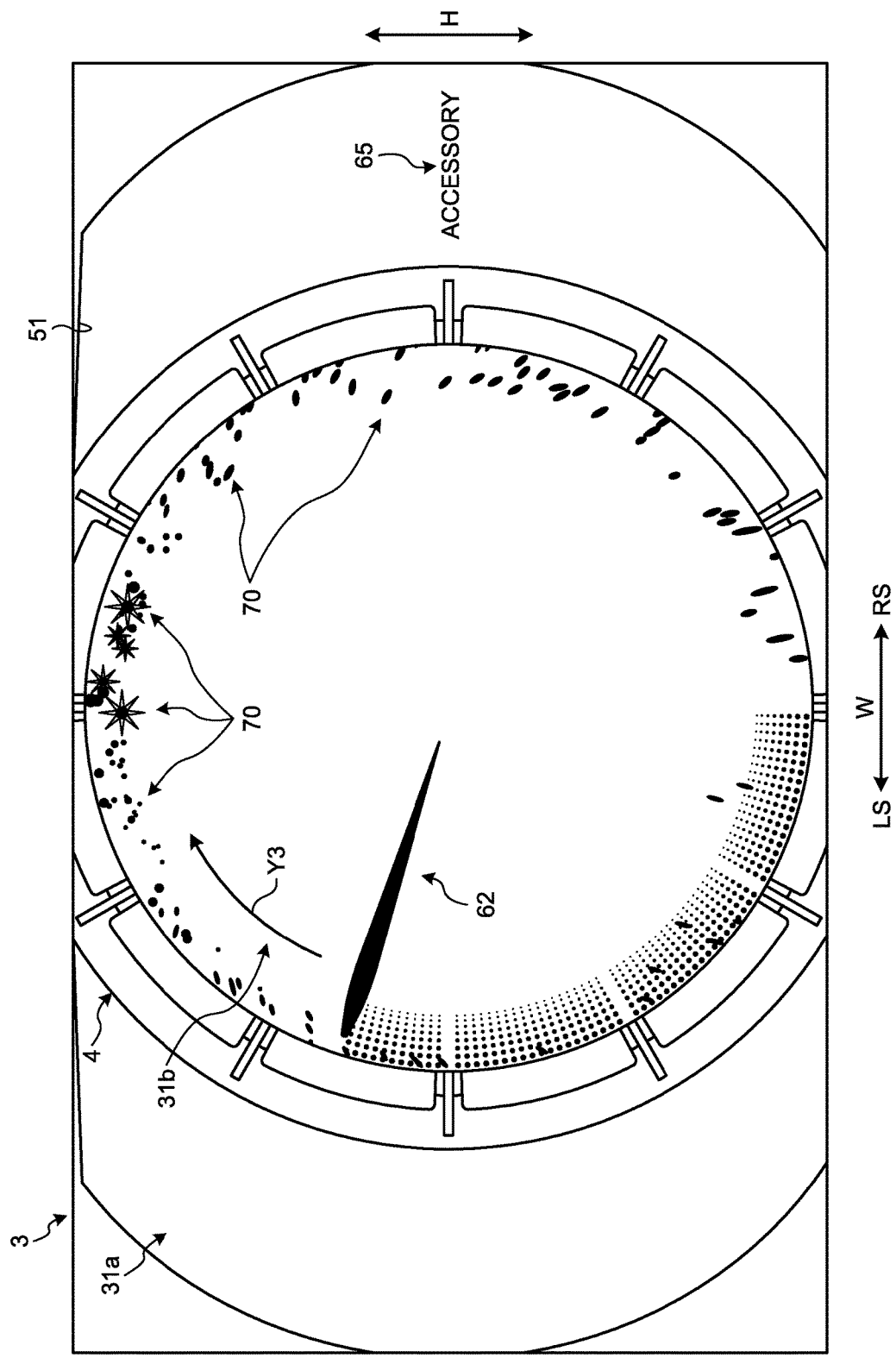
FIG. 8 is a view of the initial stage of an opening presentation according to the embodiment.
Figure 9:
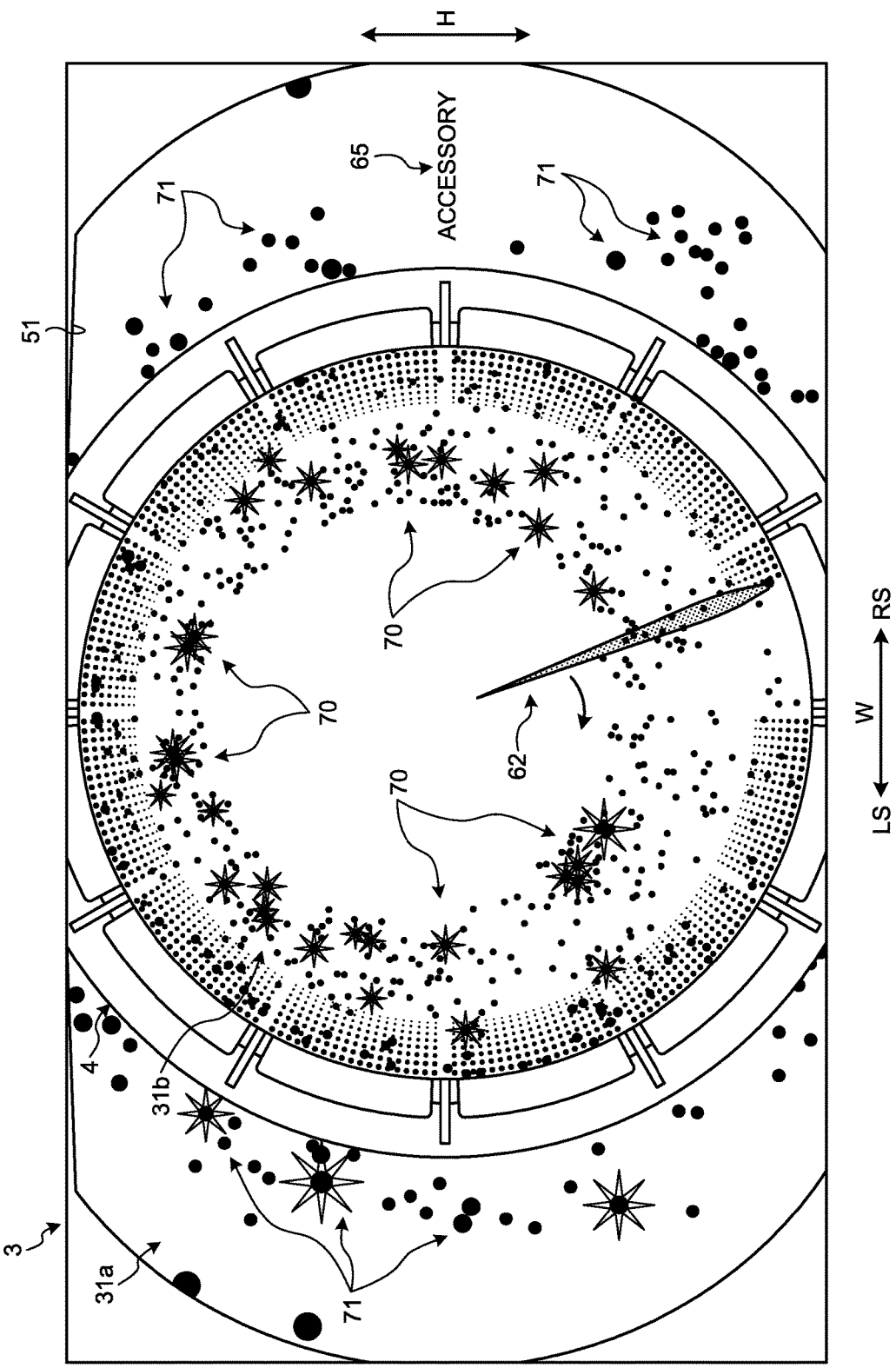
FIG. 9 is a view illustrating the opening presentation according to the embodiment before an indicator needle image stops rotating.
Figure 10:
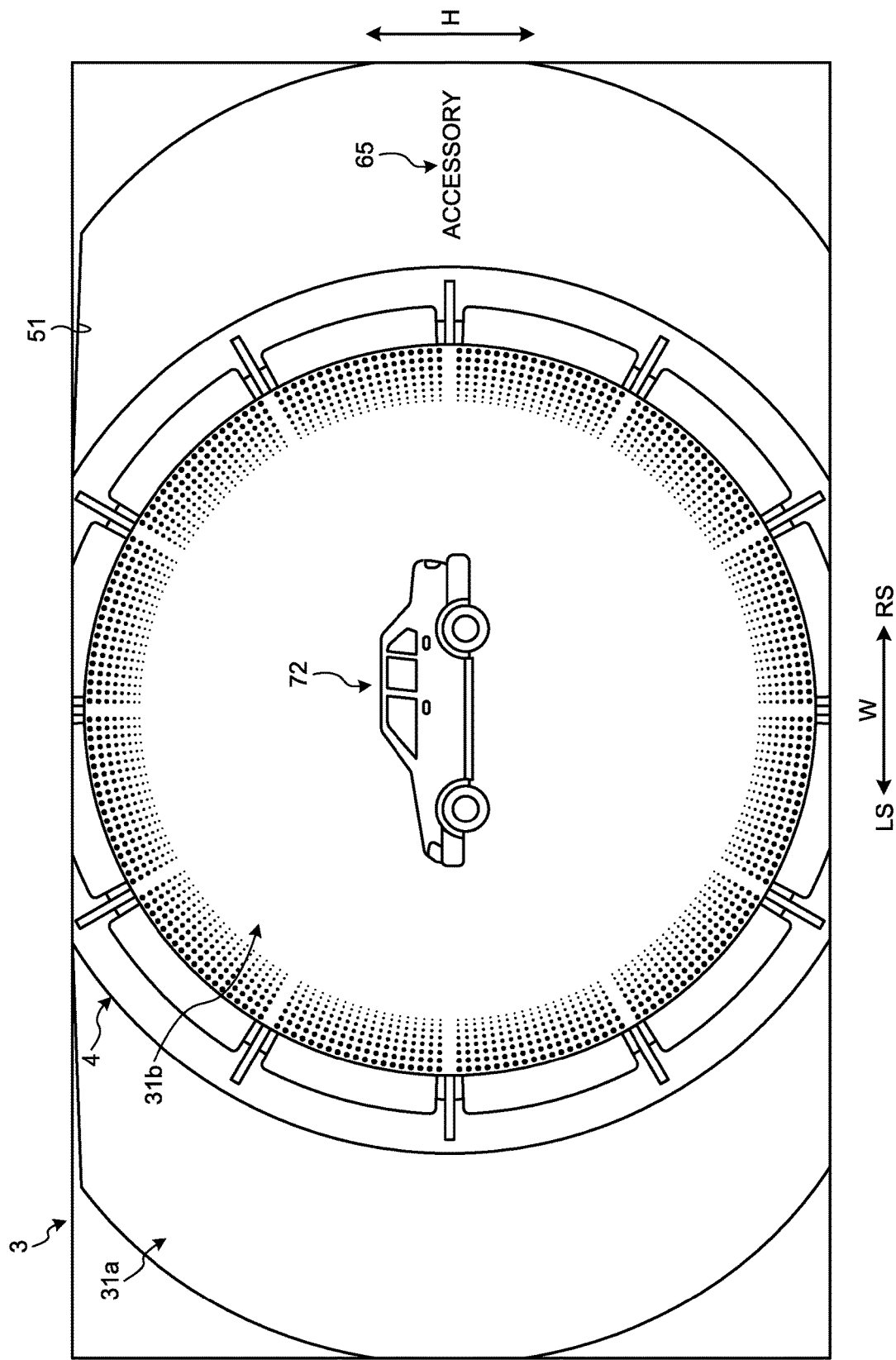
FIG. 10 is a view illustrating a state in which the opening presentation according to the embodiment has a design image displayed thereon.
Figure 11:
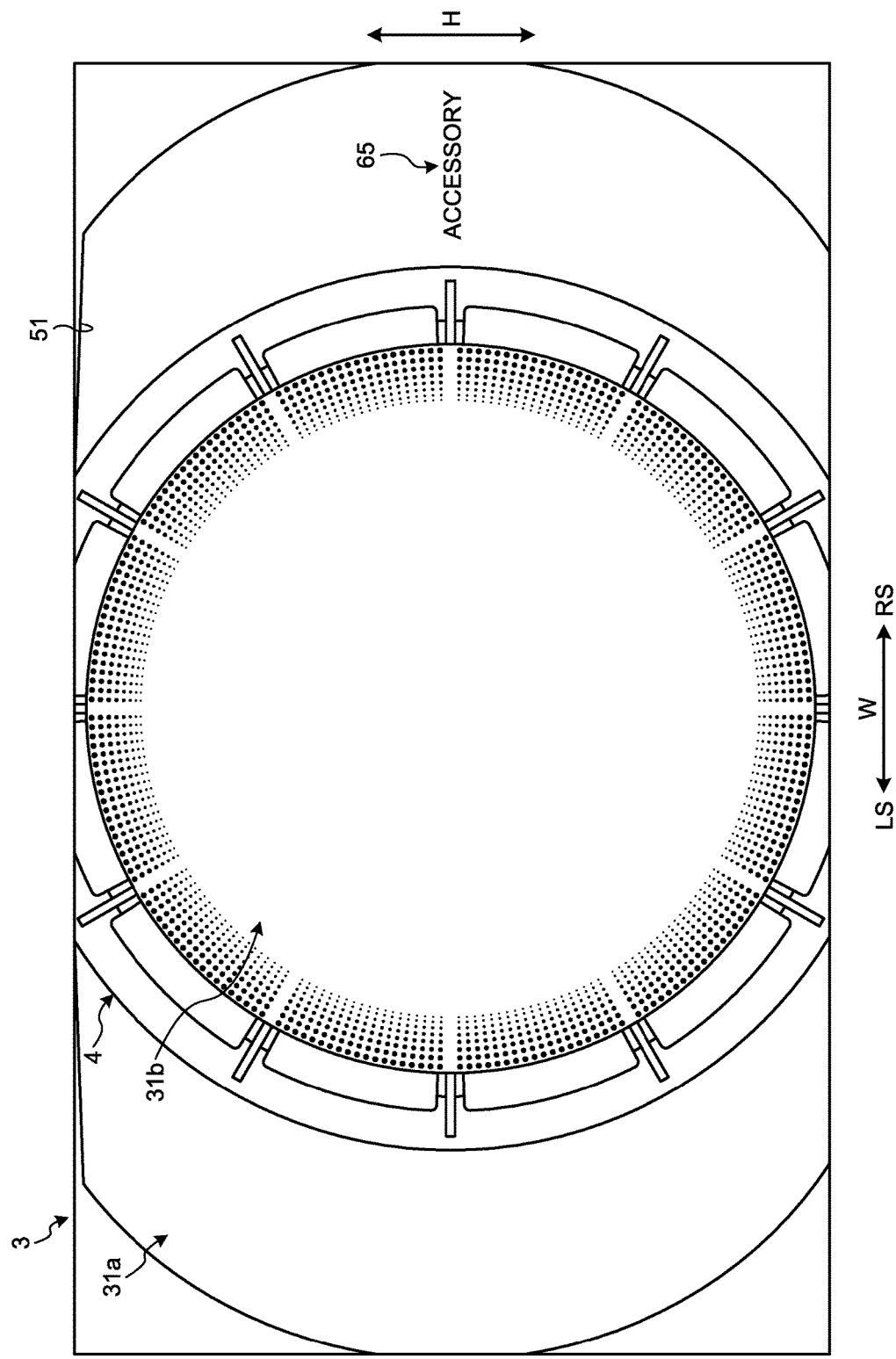
FIG. 11 is a view illustrating a state of the opening presentation according to the embodiment after the end of the opening presentation.

An embodiment is described hereinbelow with reference to FIG. 1 to FIG. 17. This embodiment relates to a vehicle display device. FIG. 1 is a front view of a vehicle display device according to the embodiment; FIG. 2 is a front view of a state in which a ring is at a second position in the vehicle display device according to the embodiment; FIG. 3 is a front view of an image display device according to the embodiment; FIG. 4 is a block diagram for the vehicle display device according to the embodiment; FIG. 5 is a view illustrating a state in which the vehicle display device according to the embodiment has not been powered off; FIG. 6 is a view of the vehicle display device according to the embodiment halfway in the process of displaying a predetermined image thereon; FIG. 7 is a view illustrating a state in which the vehicle display device according to the embodiment has a predetermined image displayed thereon; FIG. 8 is a view of the initial stage of an opening presentation according to the embodiment; FIG. 9 is a view illustrating the opening presentation according to the embodiment before an indicator needle image stops rotating; FIG. 10 is a view illustrating a state in which the opening presentation according to the embodiment has a design image displayed thereon; FIG. 11 is a view illustrating a state of the opening presentation according to the embodiment after the end of the opening presentation.

As illustrated in FIG. 1, a vehicle display device 1 according to this embodiment includes a housing 2, an image display device, an image display device 3, a ring 4, and a character plate 5. The vehicle display device 1 according to this embodiment has a display function as a vehicle meter device. The vehicle display device 1 is disposed in front of a driver aboard a vehicle 100, for example, is disposed in an instrument panel.

The housing 2 internally contains and holds components and devices including the image display device 3, the ring 4, and the character plate 5. The housing 2 has an opening 21. The housing 2 is disposed with the opening 21 facing the driver, in other words, facing the rear of the vehicle. Hereinafter, one side of the vehicle display device 1 that faces rearward in the front-rear direction of the vehicle is referred to as the "front-face side", and another side thereof that faces frontward in the front-rear direction of the vehicle as the "back-face side". The vehicle display device 1 is disposed so that the front-face side thereof can face the driver. The driver visually recognizes the image display device 3, the ring 4, and the character plate 5 through the opening 21.

As illustrated in FIG. 1, the housing 2 has a rectangular shape the length of which in a vehicle-width direction W is longer than the length thereof in a vehicle-height direction H, as viewed toward the front thereof. The housing 2 is formed of metal, synthetic resin, or the like. On the front face of the housing 2, a facing 22 projecting frontward from the opening 21 is provided. The facing 22 is a tubular component and is formed integrally with a main body portion of the housing 2. The front-face side of the facing 22 is sealed off with a transparent cover.

The character plate 5 is a plate-shapede member, and is disposed so as to seal off the opening 21 from the back-face side. The character plate 5 is formed of, for example, synthetic resin. The character plate 5 is secured to the housing 2. A window 51 is provided in a central portion of the character plate 5. The window 51 is a portion through which light can pass. The window 51 may be a through-hole penetrating the character plate 5, or may be a light-transmitting region provided in the character plate 5. The window 51 has a landscape shape the length of which in the vehicle-width direction W is longer than the length thereof in the vehicle-height direction H. The window 51 in this embodiment has a shape obtained by swelling each of the short sides of a rectangle outward in the vehicle-width direction W into an arc shape. The shapes of the arc portions of the window 51 correspond to the shape of the ring 4.

Design displaying regions 52 and 53 are provided to both sides of the window 51 in the vehicle-width direction W. While the design displaying region 52 is provided to one side of the window 51 in the vehicle-width direction W, the design displaying region 53 is provided to the other side of the window 51 in the vehicle-width direction W. A plurality of displayed designs 54 are arranged in each of the design displaying regions 52 and 53. The displayed designs 54 are figures or characters indicating various kinds of information on the vehicle 100. Each of the displayed designs 54 is, for example, an outlined printed region on the character plate 5 and is a translucent region. To the back-face sides of the design displaying regions 52 and 53, light sources are disposed for the respective displayed designs 54. The displayed designs 54 display characters or figures when the corresponding light sources are on.

The image display device 3 is disposed toward the back-face side of the character plate 5. The image display device 3 in this embodiment is a liquid crystal display device such as a thin film transistor-liquid crystal display (TFT-LCD). As illustrated in FIG. 3, the image display device 3 includes a liquid crystal display unit 31 and a frame member 32. The frame member 32 surrounds the periphery of the liquid crystal display unit 31 and supports the liquid crystal display unit 31.

The image display device 3 is disposed with the liquid crystal display unit 31 facing toward the front-face side. A backlight unit is disposed toward the back-face side of the liquid crystal display unit 31. The image display device 3 further includes a control unit that controls the liquid crystal display unit 31 and the backlight unit. The liquid crystal display unit 31 displays thereon desired images in response to commands from the control unit. Images displayed on the liquid crystal display unit 31 are projected toward the front-face side with light emitted by the backlight unit.

The size of the window 51 in the character plate 5 is smaller than the size of the liquid crystal display unit 31. The window 51 is opposed to the main part of the liquid crystal display unit 31. The driver can visually recognize the main part of the liquid crystal display unit 31 through the window 51. A part of the character plate 5 that surrounds the window 51 makes the periphery of the liquid crystal display unit 31 and the frame member 32 that supports the liquid crystal display unit 31 invisible from the driver. In the liquid crystal display unit 31, a region corresponding to the window 51 is referred to as an "image display region 31a" (see FIG. 3). The image display region 31a is a region in which various images are displayed, and a region that can be visually recognized from the driver.

Referring back to FIG. 1, the ring 4 is a member disposed to the front-face side of the character plate 5. The ring 4 in this embodiment has an annular shape. The outer diameter D1 of the ring 4 is slightly smaller than the maximum width H1 of the opening 21 in the vehicle-height direction H. The inner diameter D2 of the ring 4 is smaller than the width H2 of the window 51 in the vehicle-height direction H. While the upper end of the ring 4 is present higher than the upper end of the window 51 in the vehicle-height direction, the lower end of the ring 4 is present lower than the lower end of the window 51 in the vehicle-height direction.

The ring 4 in this embodiment can be moved in the vehicle-width direction W relative to the character plate 5. More specifically, the upper end of the ring 4 is coupled to a drive mechanism by an upper holding member (not illustrated). The upper holding member is made invisible from the driver by a cover member 6 attached to the housing 2. The drive mechanism includes a motor and a gear, and is configured to convert rotation torque generated by the motor into drive force that acts in the vehicle-width direction W and transmit the drive force to the ring 4. The drive mechanism switches directions in which the motor rotates, thereby changing movement of the ring 4 between movement toward a left side LS and movement toward a right side RS in the vehicle-width direction W.

The lower end of the ring 4 is coupled to a guide portion by a lower holding member (not illustrated). The lower holding member is made invisible from the driver by a cover member 7 attached to the housing 2. The guide portion is a guide rail or the like that extends in the vehicle-width direction W The guide portion restricts a range within which the ring 4 can move in the vehicle-width direction W. The ring 4 in this embodiment can be moved in the vehicle-width direction W between a first position illustrated in FIG. 1 and a second position illustrated in FIG. 2. The first position is a limit position to which the ring 4 can be moved toward the left side LS of the vehicle. The second position is another limit position to which the ring 4 can be moved toward the right side RS of the vehicle.

The first position in this embodiment is a central portion in the opening 21 in the vehicle-width direction W. The first position is also a central portion in the window 51 in the vehicle-width direction W. The second position in this embodiment is a position in the opening 21, the position being relatively near to an end of the opening 21 in the right side RS thereof with respect to the vehicle. The second position is an end of the window 51 in the right side RS of the vehicle. More specifically, when the ring 4 is at the second position, a right end 42 thereof overlaps the right end of the window 51 as illustrated in FIG. 2.

On the vehicle 100 in this embodiment, a navigation device 8 is further installed as illustrated in FIG. 4. The navigation device 8 is a device configured to provide information such as detailed map information on the current position and the surroundings of the vehicle 100 and routing assistance to a destination. The navigation device 8 in this embodiment is disposed in front of the driver. The navigation device 8 is disposed so that an image display unit 8a for displaying images thereon can face the driver. The image display unit 8a is a liquid crystal display device such as a thin film transistor-liquid crystal display (TFT-LCD). The navigation device 8 may be disposed adjacently to the vehicle display device 1.

The image display device 3 and the navigation device 8 both can receive signals from a power switch 9 of the vehicle 100. The power switch 9 is an input unit to which operation input of a startup command and the like for the vehicle 100 is provided. By providing operation input to the power switch 9, a user (typically, a driver) can provide: a command to set accessories on (hereinafter referred to simply as "ACC command"); a command to set the ignition on (hereinafter referred to simply as "IG command"); a command to power off the vehicle 100 (hereinafter referred to simply as "OFF command"); and a command to set the vehicle 100 into a traveling-enabled state (hereinafter referred to simply as "ST command"). For example, when the power switch 9 is pressed while a brake pedal is not being stomped, the pressing operation goes through, in order, a transition from the ACC command to the IG command, and a transition from the IG command to the OFF command, the transitions each occurring when the power switch 9 is pressed. When the power switch 9 is pressed while the brake pedal is stomped, the pressing operation results in the ST command. The ST command is a command to turn on a drive system of the vehicle 100, that is, a system startup command.

In an accessory-on state, some of the electrical components of the vehicle 100, such as an audio device, the navigation device 8, and interior lighting, are powered. In an ignition-on state, all of the electrical components of the vehicle are powered. Both in the accessory-on state and in the ignition-on state, the drive system of the vehicle 100 including an engine, a motor, and a transmission is not powered. A traveling-enabled state of the vehicle 100 is a state in which the vehicle 100 has become able to travel upon completion of starting up all of the devices in the drive system. The traveling-enabled state is a state in which a drive source including an engine and a motor can generate power whereby the vehicle 100 can start traveling.

Among the above kinds of operation input to the power switch 9, the ACC command, the IG command, and the ST command are kinds of operation input that are provided for powering on the vehicle 100. In the following description, the operation input for the ACC command, the IG command, and the ST command may be referred to collectively as "power-on operation". The OFF command is an operation input that powers off the vehicle 100.

Figure 12:
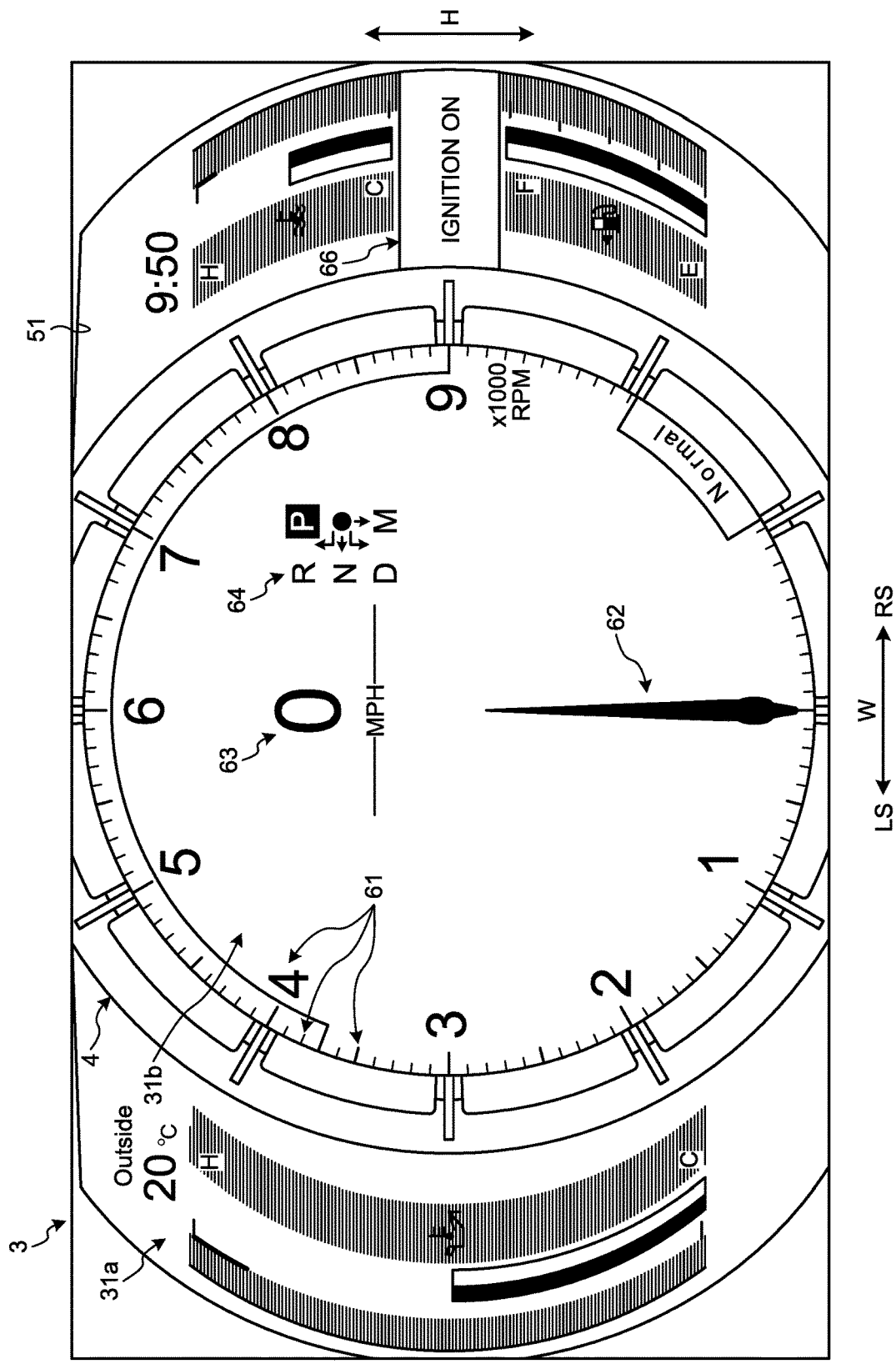
FIG. 12 is a view illustrating an ignition-on screen of the vehicle display device according to the embodiment.

The vehicle display device 1 and the navigation device 8 each power itself on and start up a system of its own when a signal for the ACC command, the IG command, or the ST command is received while the system has been off. The vehicle display device 1, as well as the navigation device 8, performs a startup process including various kinds of initialization, and, upon completion of the startup process, performs an opening presentation. The opening presentation (hereinafter referred to simply as "meter presentation") on the vehicle display device 1 is performed by the image display device 3. The meter presentation is a presentation that the vehicle display device 1 starts off with after having been completely started up and become able to display images. Images to be displayed in the meter presentation typically include images, such as images for decoration, that are different from those that are displayed on a ready-on screen (FIG. 17) or an ignition-on screen (FIG. 12). The opening presentation (hereinafter referred to simply as "navigation presentation") on the navigation device 8 is performed by an image display unit 8a. The image display device 3 and the navigation device 8 in this embodiment perform the opening presentations in conjunction with each other. In one example of operation for performing the opening presentations in conjunction with each other, the image display device 3 and the navigation device 8 coordinate, with each other, the times when the opening presentations are started.

A time period needed for the startup process of the navigation device 8 is longer than a time period needed for the startup process of the vehicle display device 1. For this reason, the image display device 3 according to this embodiment starts the opening presentation in conjunction with a presentation start signal output from the navigation device 8. A control unit 33 of the image display device 3 is communicably connected to the navigation device 8. The navigation device 8 transmits the presentation start signal to the control unit 33 before starting the navigation showing upon completion of the startup process thereof. Upon receiving the showing start signal, the image display device 3 starts the meter presentation. Starting the meter presentation and the navigation presentation in conjunction with each other brings a feeling of unity, a feeling of congruence, and a feeling of high class across these display devices.

The image display device 3 in this embodiment displays thereon a predetermined image in a part of the image display region 31*a* thereof until starting the meter presentation after an operation input that powers on the vehicle 100 is provided. This prevents the user from feeling incongruity. For example, suppose that no image is displayed on the image display device 3 until the meter presentation is started after a power-on operation is performed. In this case, the user may have an impression that, despite the power-on operation, the vehicle display device 1 is not functioning in response thereto.

As described hereinbelow, the image display device 3 in this embodiment displays an indicator needle image 62 in the image display region 31*a* in response to the power-on operation. Displaying the indicator needle image 62 can serve to notify the user that the startup of the vehicle display device 1 is completed, and prevent the user from finding the display incongruent.

FIG. 5 illustrates the image display device 3 that has been powered off. In this embodiment, a region in the image display region 31*a* inside of the ring 4 is referred to as an inside region 31*b*. The inside region 31*b* is a region that is a part of the image display region 31*a*. The position of the inside region 31*b* may change in response to movement of the ring 4 in the vehicle-width direction W. This example, however, is not limiting, and the position of the inside region 31*b* may be a position surrounded by the ring 4 that is at the first position, or may be a position surrounded by the ring 4 that is at the second position. FIG. 5 illustrates the inside region 31*b* with the ring 4 being at the first position. The vehicle display device 1 is powered off while the ring 4 is at the first position.

The image display device 3 goes through the startup process upon detecting the power-on operation. Upon completion of the startup process, the image display device 3 transitions to a standby state in which it waits for the presentation start signal coming in from the navigation device 8. How the image display device 3 operates is described herein, assuming that operation input provided by the user is the ACC command.

Upon receiving the ACC command, the image display device 3 goes through the startup process. Upon becoming able to display images in the image display region 31*a* after the completion of the startup, the image display device 3 displays the indicator needle image 62 and a status image 65 in the image display region 31*a* as illustrated in FIG. 6 and FIG. 7. The status image 65 is an image indicating that the vehicle 100 is in the accessory-on state. The image display device 3 displays the indicator needle image 62 and the status image 65 as animated images. The image display device 3 in this embodiment displays the indicator needle image 62 and the status image 65 as sliding into view as illustrated in FIG. 6. The indicator needle image 62 is displayed as sliding into view downward from a central portion of the inside region 31*b* as indicated by the arrow Y1. The status image 65 is displayed as sliding into view rightward from the right end 42 of the ring 4 as indicated by the arrow Y2. In this embodiment, the display position of the indicator needle image 62 is a position at which a speed of 0 is indicated for the engine revolution speed.

FIG. 7 illustrates a state in which displaying the indicator needle image 62 and the status image 65 as sliding into view is completed. The image display device 3 waits in the state illustrated in FIG. 7 until receiving a presentation start signal from the navigation device 8. That is, the image display device 3 keeps displaying still images illustrated in FIG. 7 on the image display region 31*a* until receiving the presentation start signal. Upon receiving the presentation start signal, the image display device 3 starts the meter presentation.

FIG. 8 illustrates an example of a presentation screen in the meter presentation. The image display device 3 in this embodiment, in the meter presentation, displays the indicator needle image 62 as an animated image rotated as indicated by the arrow Y3 in FIG. 8. The image display device 3 rotates the indicator needle image 62 about the center of the inside region 31*b* clockwise as viewed from the driver. That is, the direction of the rotation of the indicator needle image 62 is a direction corresponding to increase in engine revolution speed. The image display device 3 further displays decorative images 70 for decoration in the inside region 31*b*. The decorative images 70 are displayed, for example, in a marginal portion of the inside region 31*b* at the beginning. In the inside region 31*b*, an area in which the decorative images 70 are displayed expands toward the center of the inside region 31*b*.

FIG. 9 illustrates a state immediately before displaying the indicator needle image 62 as an animated rotating image is ended. The image display device 3 causes the indicator needle image 62 to make a 360-degree rotation, and then hides the indicator needle image 62. The image display device 3 in this embodiment hides the indicator needle image 62 by causing it to fade out. By increasing the transparency of the indicator needle image 62 as the indicator needle image 62 comes closer to a position at which it ends rotating, the image display device 3 causes the indicator needle image 62 to fade out. In addition to the inside region 31*b*, the image display device 3 displays decorative images 71 in a region outside of the ring 4. The decorative images 71 are the same as or similar to the decorative images 70 that are displayed in the inside region 31*b*. An area in which the decorative images 71 are displayed expands, for example, toward the edge of the image display region 31*a*.

After hiding the indicator needle image 62, the image display device 3 displays a design image 72 illustrated in FIG. 10, and hides the decorative images 70 and 71. FIG. 10 illustrates a state in which the design image 72 is displayed while the indicator needle image 62 and the decorative images 70 and 71 are hidden. The design image 72 is, for example, an image of the shape of the vehicle 100 as viewed from one side thereof.

FIG. 11 illustrates a state after the meter presentation is ended. The image display device 3 hides the design image 72 at the end of the meter presentation. The image display device 3 in this embodiment causes the design image 72 to fade out. The meter presentation is completed by the completion of fading out of the design image 72. The image display device 3 in this embodiment completes the meter presentation in conjunction with the completion of the navigation presentation. For example, it is possible to previously set a time period needed for the navigation presentation and a time period needed for the meter presentation equal to each other. Alternatively, the meter presentation may be ended based on a presentation end signal sent from the navigation device 8. As illustrated in FIG. 11, before any operation input is provided to the power switch 9 after the end of the meter presentation, the indicator needle image 62 is kept hidden and the status image 65 is displayed. Upon completion of the navigation presentation, the navigation device 8 switches display on the image display unit 8*a* to an information display screen. The information display screen is, for example, a map screen for the area around the current location of the vehicle 100.

In the state illustrated in FIG. 11, if the power switch 9 is pressed while the brake pedal is not stomped, the pressing operation is received as the IG command. When the IG command is provided, the image display device 3 changes display on the image display region 31*a* to an ignition-on screen illustrated in FIG. 12. On the ignition-on screen, scale mark images 61, the indicator needle image 62, a vehicle speed image 63, and a shift-lever position image 64 are displayed in the inside region 31*b*. A status image 66 and the like are also displayed outside the ring 4. The status image 66 is an image indicating that the vehicle 100 is in the ignition-on state. The status image 66 is displayed, for example, at the same position as the status image 65 indicative of the accessory-on state.

The scale mark images 61 are displayed as marks for a physical quantity corresponding to an output speed of a drive source installed on the vehicle 100. In this embodiment, the drive source is an engine, and the physical quantity corresponding to the output speed is an engine revolution speed (in revolution per minute or RPM). The indicator needle image 62 is displayed as an indicator needle that indicates the current value of the engine revolution speed. More specifically, the indicator needle image 62 is displayed so as to point to one of the scale mark images 61 circumferentially aligned, the one corresponding to the current engine revolution speed. In the ignition-on state, the engine is at rest, and the indicator needle image 62 is displayed at a position indicating a speed of 0. A display position of the indicator needle image 62 in the standby state for waiting for reception of the presentation start signal is the same position as the one illustrated in FIG. 12, that is, the position indicating a speed of 0.

The vehicle speed image 63 is an image of at least one digit indicating the current traveling speed of the vehicle 100. The vehicle speed image 63 is displayed at a position in the upper half of the inside region 31*b* in the vertical direction of the image. The shift-lever position image 64 is an image indicating the current position of the shift lever. The shift-lever position image 64 is displayed to the right of the vehicle speed image 63 in a lateral direction of the image, that is, to the right side RS thereof in the vehicle-width direction W.

Figure 13:
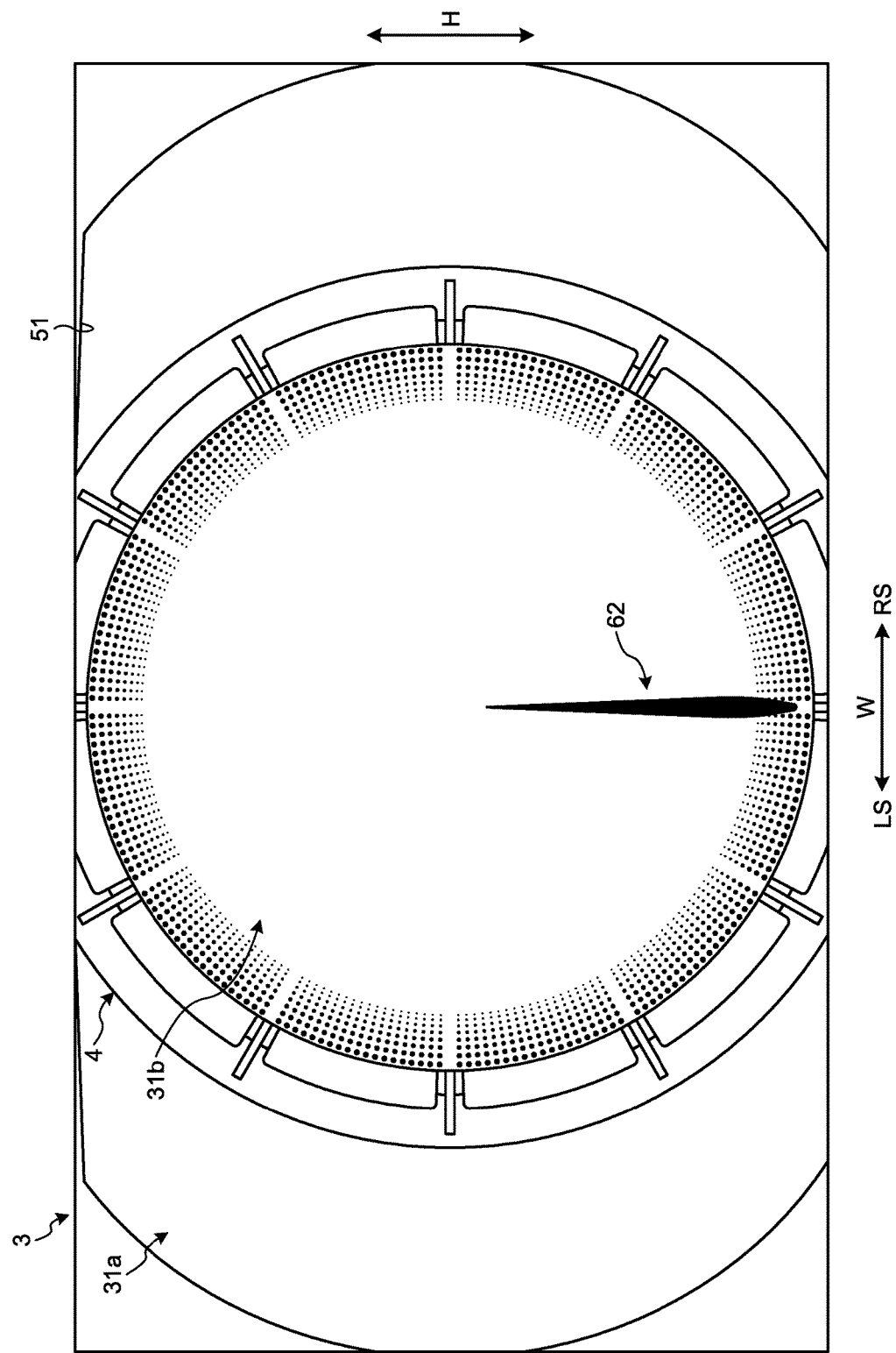
FIG. 13 is a view of a state in which an indicator needle image has been displayed in response to a system startup command in the vehicle display device according to the embodiment.

Next, the opening presentations to be performed when the ST command is provided with the vehicle 100 powered off are described. Upon becoming able to display images after the ST command is provided, the image display device 3 displays the indicator needle image 62 as illustrated in FIG. 13. When displaying the indicator needle image 62 in response to the ST command, the image display device 3 in this embodiment instantly displays the indicator needle image 62. Accordingly, displaying the indicator needle image 62 as sliding into view is omitted. In response to the ST command, the engine of the vehicle 100 is started. The timing at which the engine is started may differ depending on how the drive system of the vehicle 100 is configured. For example, in a hybrid vehicle having an engine and a travel-use motor installed thereon, the timing at which the engine is started is determined in accordance with a charge request and a warm-up request.

Figure 14:
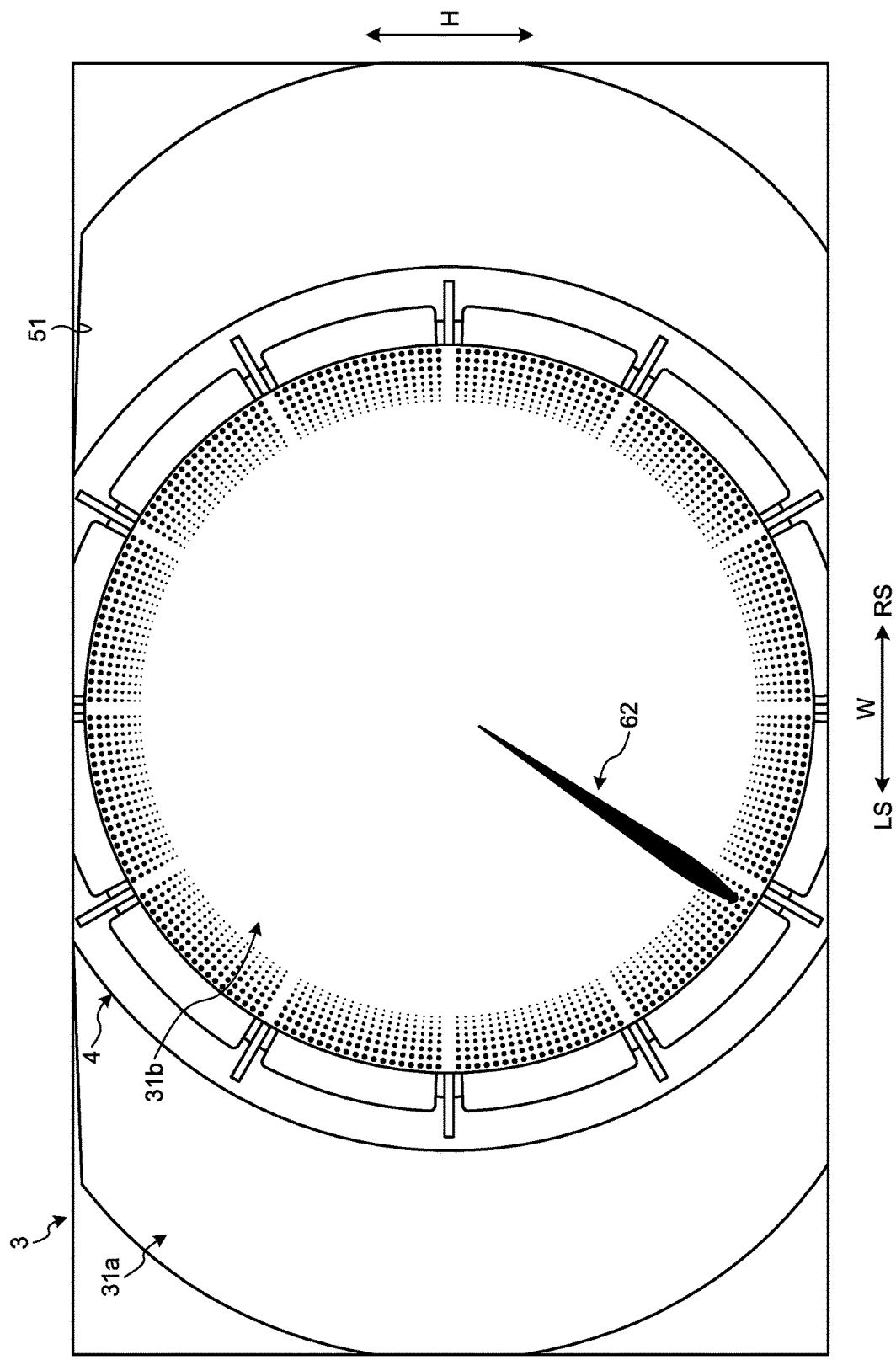
FIG. 14 is a view illustrating the indicator needle image displayed at a position corresponding to an engine revolution speed in the vehicle display device according to the embodiment.

After the engine is started, the image display device 3 rotates the indicator needle image 62 in accordance with the engine revolution speed. As illustrated in FIG. 14, the image display device 3 displays the indicator needle image 62 at a position corresponding to the engine revolution speed that has been detected. Changing the position of the indicator needle image 62 in conjunction with the operation of the engine informs the user that the vehicle 100 is transitioning to a state in which it can travel.

Figure 15:
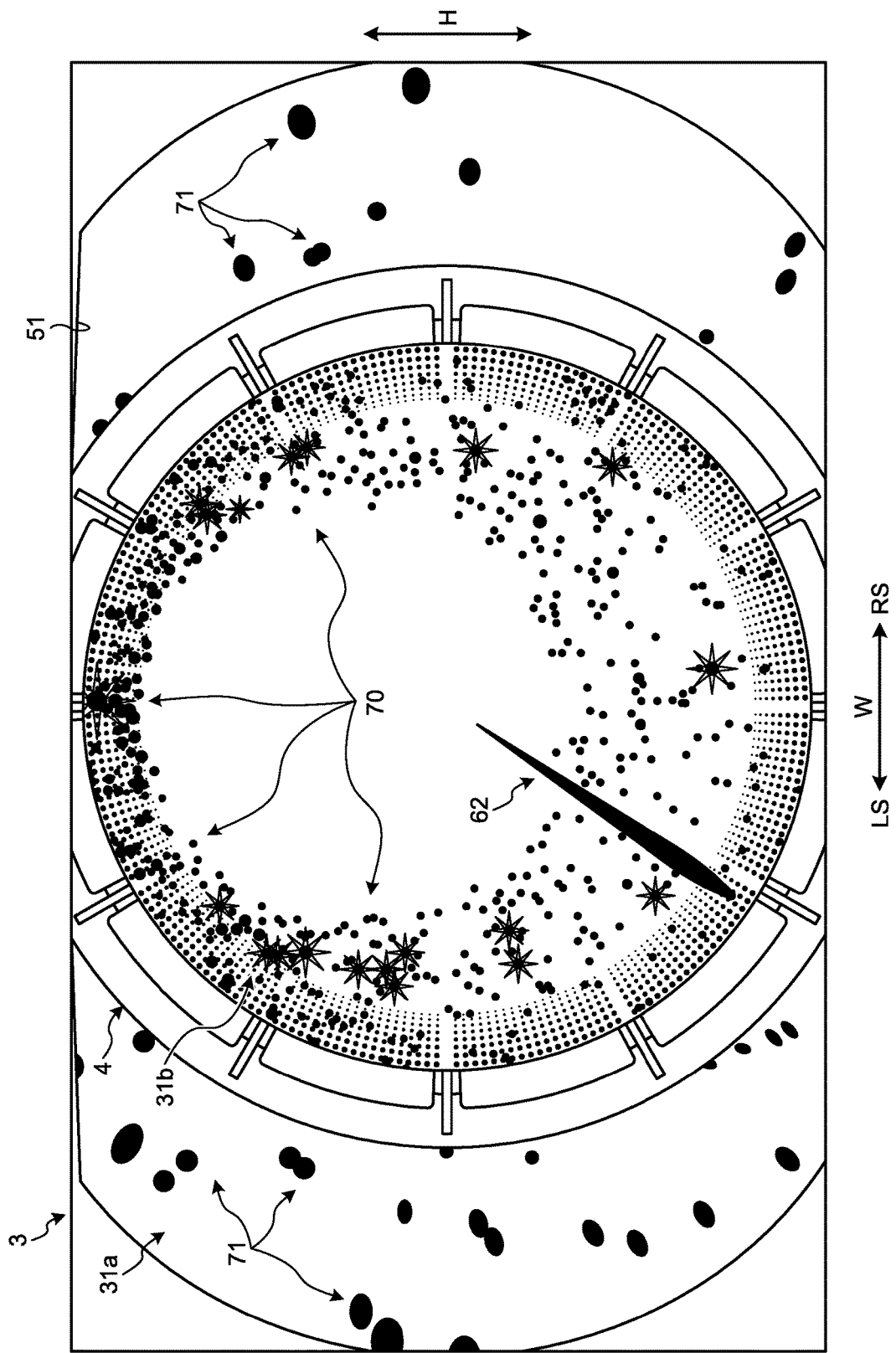
FIG. 15 is a view illustrating the opening presentation performed in response to the system startup command.

Before the presentation start signal is received from the navigation device 8, images such as the scale mark images 61, the vehicle speed image 63, and the shift-lever position image 64 are hidden from the inside region 31*b* as illustrated in FIG. 14. The image display device 3 starts the meter presentation upon receiving a presentation start signal. If the ST command has been provided, the indicator needle image 62 is excluded from elements of the presentation in the meter presentation. As illustrated in FIG. 15, the image display device 3 displays the decorative images 70 and 71 with the indicator needle image 62 being displayed at a position corresponding to the current engine revolution speed.

Figure 16:
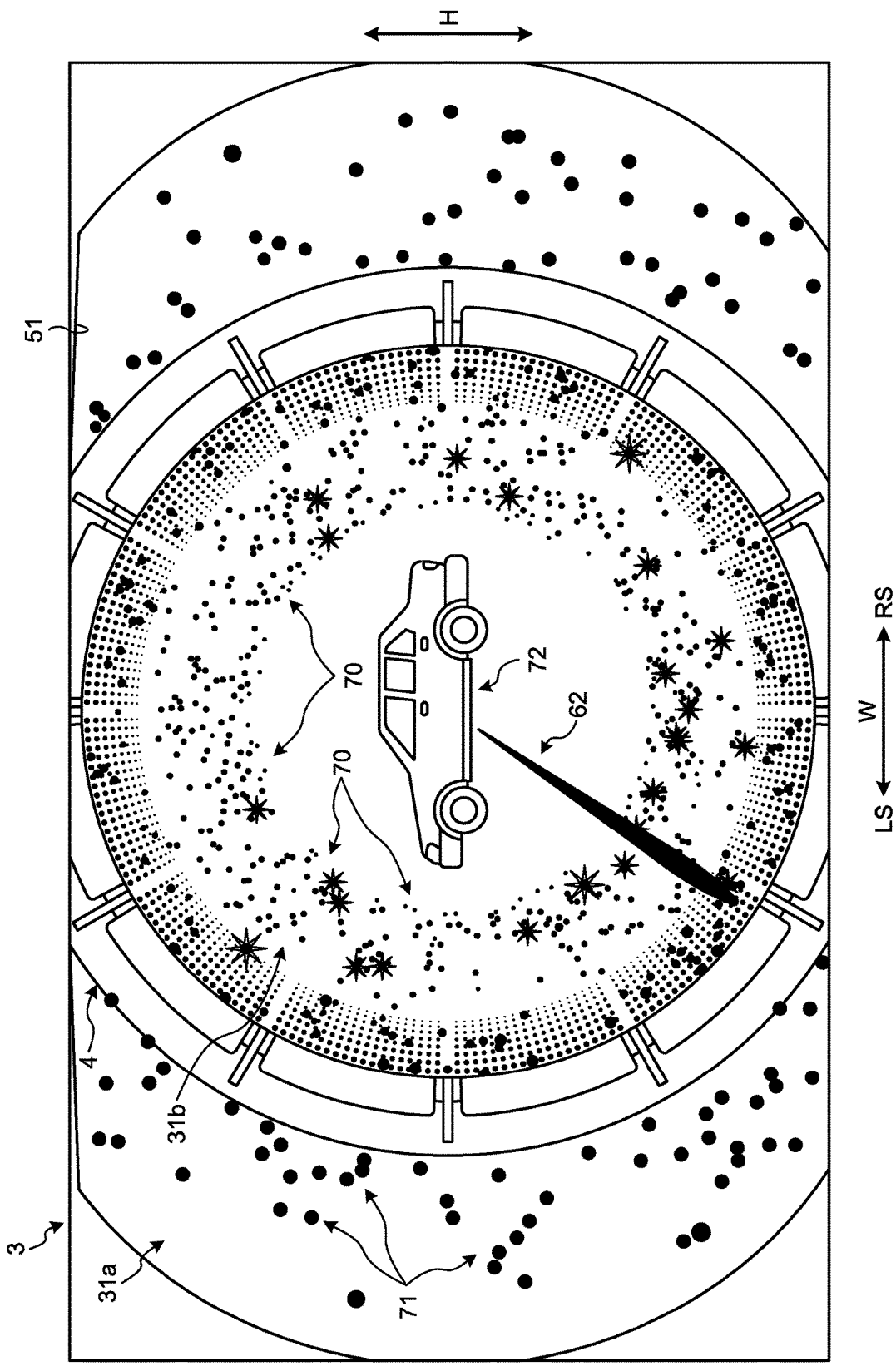
FIG. 16 is another view illustrating the opening presentation performed in response to the system startup command.

When the meter presentation further progresses, the image display device 3 displays the design image 72 in addition to the decorative images 70 and 71 as illustrated in FIG. 16. The display position of the design image 72 is, for example, the same position as in the meter presentation that is performed in response to the ACC command. The image display device 3 ends the meter presentation in conjunction with the end of the navigation presentation performed by the navigation device 8.

Figure 17:
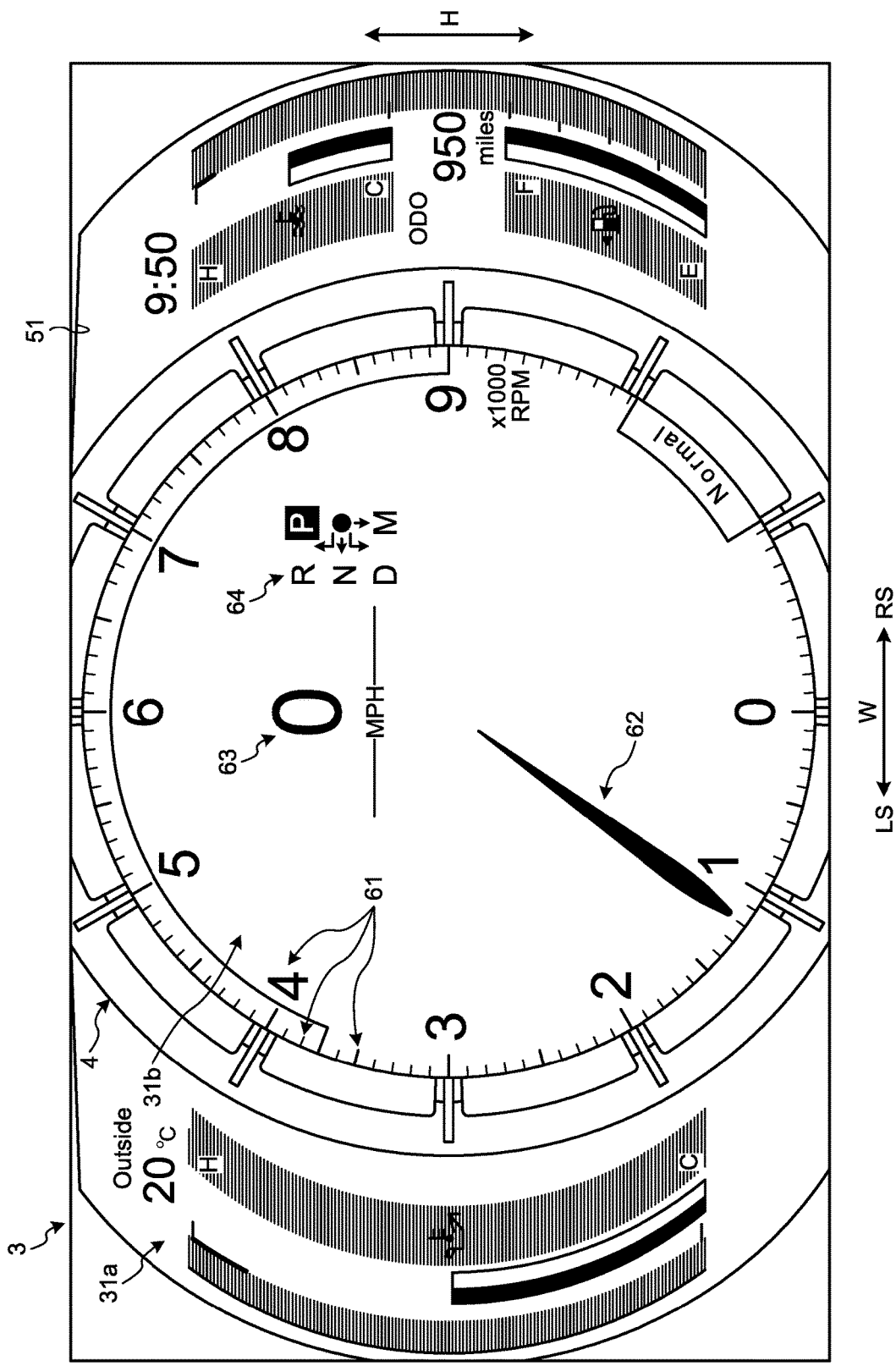
FIG. 17 is a view illustrating a ready-on screen of the vehicle display device according to the embodiment.

Upon completion of the meter presentation, the image display device 3 displays the ready-on screen as illustrated in FIG. 17. The ready-on screen is an image indicating that the vehicle 100 is in a ready-on state. The ready-on state of the vehicle 100 is a state in which the vehicle 100 has become able to travel with the drive system all set ready. On the ready-on screen, the scale mark images 61, the indicator needle image 62, the vehicle speed image 63, and the shift-lever position image 64 are displayed in the inside region 31*b*. The display position of the indicator needle image 62 is a position corresponding to the current engine revolution speed.

The image display device 3 cancels the meter presentation when operation input for starting traveling is provided while the ST command has been provided. The operation input for starting traveling is, for example, operation performed by the driver on a shift lever for traveling. When the operation input for traveling is provided, the image display device 3 stops the meter presentation and hides the decorative images 70 and 71 and the design image 72. The image display device 3 displays images including the scale mark images 61, the indicator needle image 62, the vehicle speed image 63, and the shift-lever position image 64 in the inside region 31*b*.

As described above, the vehicle display device 1 in this embodiment includes an image display device 3 disposed in front of the driver aboard the vehicle 100. The image display device 3 displays at least information on traveling conditions of the vehicle 100. The information on traveling conditions includes the revolution speed of the drive source, the temperature of the drive source, the vehicle speed, the shift-lever position, and the travel distance. When operation input for powering on the vehicle 100 is provided, the image display device 3 starts an opening presentation thereon in conjunction with the start of an opening presentation on another display device disposed in front of the driver. After the operation input that powers on the vehicle is provided, until the opening presentation is started, the image display device 3 displays thereon a predetermined image in a part of the image display region 31a. The predetermined image is, for example, the indicator needle image 62 described as an example.

After the operation input that powers on the vehicle is provided, until the opening presentation is started, the image display device 3 in this embodiment displays thereon the predetermined image and thereby informs that the vehicle display device 1 has been started up in response to the operation input. By having the user informed that it has been started up, the vehicle display device 1 can prevent the user from finding it incongruent. The vehicle display device 1 in this embodiment performs an opening presentation in conjunction with an opening presentation on another display device, thereby being able to bring a feeling of congruence with the other display device.

In this embodiment, the predetermined image is the indicator needle image 62 that indicates the revolution speed of the engine installed on the vehicle 100. The indicator needle image 62 is one of the images that are displayed in the most conspicuous fashions on the image display device 3. The indicator needle is one of the most symbolic elements in a meter device of the vehicle 100. Accordingly, as the predetermined image, the indicator needle image 62 can be easily noticed by the user. In addition, with the indicator needle image 62 thus displayed, the user can be reminded of the display function as a meter and develop a sense of reassurance and a feeling of reliability. In this embodiment, in the standby state for waiting for a presentation start signal, although the indicator needle image 62 is displayed, the scale mark images 61 as marks are not displayed. Without the scale mark images 61 displayed, the user can easily find that the vehicle display device 1 is in the standby state.

In this embodiment, the indicator needle image 62 is displayed as a still image while the engine is at rest. In contrast, in the opening presentation, the indicator needle image 62 and the decorative images 70 and 71 are displayed as animated images. Because there is a transition from the standby state in which the still image is displayed to a state in which the meter presentation is displayed as animated images, the effect of the opening presentation can be enhanced.

In this embodiment, the regions in which the predetermined images are displayed are parts of the image display region 31a. The indicator needle image 62 is displayed in a part of the inside region 31b, and the status image 65 is displayed in a part of the region outside the ring 4. No image is displayed in the remaining region of, that is, most of, the image display region 31a. In the opening presentation to be performed thereafter, the decorative images 70 and 71 are displayed all over the image display region 31a. Thus, the effect of the opening presentation is enhanced.

In this embodiment, a part in which the predetermined image is displayed is a part of a main display region of the image display region 31a. The main display region is a region on the image display device 3 in which information of high priority is displayed. The information of high priority is, for example, at least one of the engine revolution speed, the vehicle speed, and the shift-lever position. In this embodiment, the inside region 31b corresponds to the main display region. The predetermined image may be a part of an image displayed in the inside region 31b on the ready-on screen.

When the engine is started after the operation input powering on the vehicle 100 is provided, the image display device 3 in this embodiment displays the indicator needle image 62 at a position corresponding to the engine revolution speed. With the indicator needle image 62 displayed at a position corresponding to the engine revolution speed, the user can be informed of operational states of the engine. In this embodiment, the indicator needle image 62 is displayed as the predetermined image in response to either the ACC command or the IG command. Accordingly, the indicator needle image 62 that has already been displayed in response to the ST command can be moved, as it is, to the position corresponding to the engine revolution speed. This enables smooth transition from a display mode for when the engine is at rest to a display mode for when the engine is in operation.

The image display device 3 in this embodiment does not change the display position of the predetermined image until the opening presentation is started, and, after the opening presentation is started, changes the display position of the predetermined image and performs the opening presentation using the predetermined image as one element. In one specific example of this embodiment, the image display device 3 does not change the display position of the indicator needle image 62 until the opening presentation is started. In contrast, after the opening presentation is started, the image display device 3 changes the display position of the indicator needle image 62 and performs the opening presentation using the indicator needle image 62 as one element.

When display of the indicator needle image 62 is started, the indicator needle image 62 is displayed as sliding into view, and it can also be considered that the position of the indicator needle image 62 is changed. However, the direction in which the indicator needle image 62 slides into view is a direction along the axis thereof, in other words, in the radial direction of the inside region 31b. In contrast, the direction in which the indicator needle image 62 moves during the opening presentation is the circumferential direction of the inside region 31b. That is, until the opening presentation is started, the display position of the indicator needle image (the position of the centerline of the indicator needle image 62) is not changed at least in the circumferential direction. After the opening presentation is started, the display position of the indicator needle image 62 is changed in the circumferential direction. As described above, the image display device 3 does not change the display position of the indicator needle image 62 in the circumferential direction until receiving the presentation start signal, and changes the display position of the indicator needle image 62 in the circumferential direction after starting the opening presentation. Thus, the opening presentation is made further more effective. Furthermore, the scale mark images 61 are not displayed during the opening presentation. Accordingly, the user can easily recognize that the indicator needle image 62 rotates for the presentation, and not for change in engine revolution speed.

Modifications Of Embodiment

Modifications of the embodiment are described. The predetermined images are not limited to the indicator needle image 62 and the status image 65. For example, the indicator needle image 62 may be displayed without the status image 65 displayed. Instead of the indicator needle image 62, at least some of the scale mark images 61 may be displayed. For example, only images of the scale mark images 61 other than those of characters may be displayed. Otherwise, only images of characters of the scale mark images 61 may be displayed. At the start of displaying the scale mark images 61, those images may be displayed as animated images, for example, displayed as sliding into view. The scale mark images 61 are displayed, for example, as sliding into view inward from the edge of the ring 4 in the radial direction thereof, As the predetermined images, a vehicle speed image 63 and the shift-lever position image 64 may be displayed.

Images that are displayed in the meter presentation are not limited to those listed as examples. Various forms of the presentation are possible in the meter presentation. A counterpart display device in conjunction with which the meter presentation is performed is not limited to the navigation device 8. As the counterpart display device, an device that needs a longer time period for startup than the vehicle display device 1 is considered. The vehicle display device 1 may perform the opening presentation in conjunction with a plurality of external display device. For example, the vehicle display device 1 may perform the opening presentation in conjunction with the navigation device 8 and a headup display device. In this case, when one of these three devices that needs the longest time period for the completion of startup becomes ready, the three devices start opening presentations in conjunction with each other.

The direction in which the indicator needle image 62 is displayed as sliding into view when display thereof is started may be inward in the radial direction, as opposed to the direction in the above described embodiment. The rotational position at which the indicator needle image 62 is displayed is not limited to the position of a speed of 0. The rotational position at which the indicator needle image 62 is displayed is preferably different from a rotational position within the range of the idling revolution speed of the engine.

Any of the features disclosed in the above embodiment and the modifications can be implemented in combination as appropriate.

A vehicle display device according to the present embodiment includes an image display device disposed in front of a driver aboard a vehicle and configured to display thereon at least information on traveling conditions of the vehicle. When operation input powering on the vehicle is provided, the image display device starts an opening presentation thereon in conjunction with the start of an opening presentation on another display device disposed in front of the driver. The image display device displays thereon a predetermined image in a part of an image display region until starting the opening presentation after operation input is provided. The vehicle display device according to the present embodiment starts an opening presentation in conjunction with the start of display of an opening presentation on the other display device, thereby being effective in bringing a feeling of congruence thereof with the other display device.

Although the invention has been described with respect to the specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a first image display device disposed in front of a driver in a vehicle, and configured to display thereon at least information relating to traveling conditions of the vehicle, the first image display device including a first image display region;
   a second image display device disposed in front of the driver and including a second image display region;
   a controller for controlling the first image display device to start a first opening presentation thereon in conjunction with a start of a second opening presentation of the second image display device, wherein
   the first image display device displays a predetermined image on the first image display region until the start of the second opening presentation of the second image display device, after an operation input turning on a power supply of the vehicle is provided.

2. The vehicle display device according to claim 1, wherein
   the predetermined image is an image of an indicator needle that indicates a revolution speed of an engine installed on the vehicle.

3. The vehicle display device according to claim 2, wherein
   when the engine is started after the operation input is provided, the first image display device displays the indicator needle image at a position corresponding to the revolution speed of the engine.

4. The vehicle display device according to claim 1, wherein
   the first image display device does not change a display position of the predetermined image until the start of the second opening presentation, and, after the second opening presentation is started, changes the display position of the predetermined image and performs the first opening presentation using the predetermined image as one element.

5. The vehicle display device according to claim 2, wherein
   the first image display device does not change a display position of the predetermined image until the start of the second opening presentation, and, after the second opening presentation is started, changes the display position of the predetermined image and performs the first opening presentation using the predetermined image as one element.

* * * * *